Figure 1:
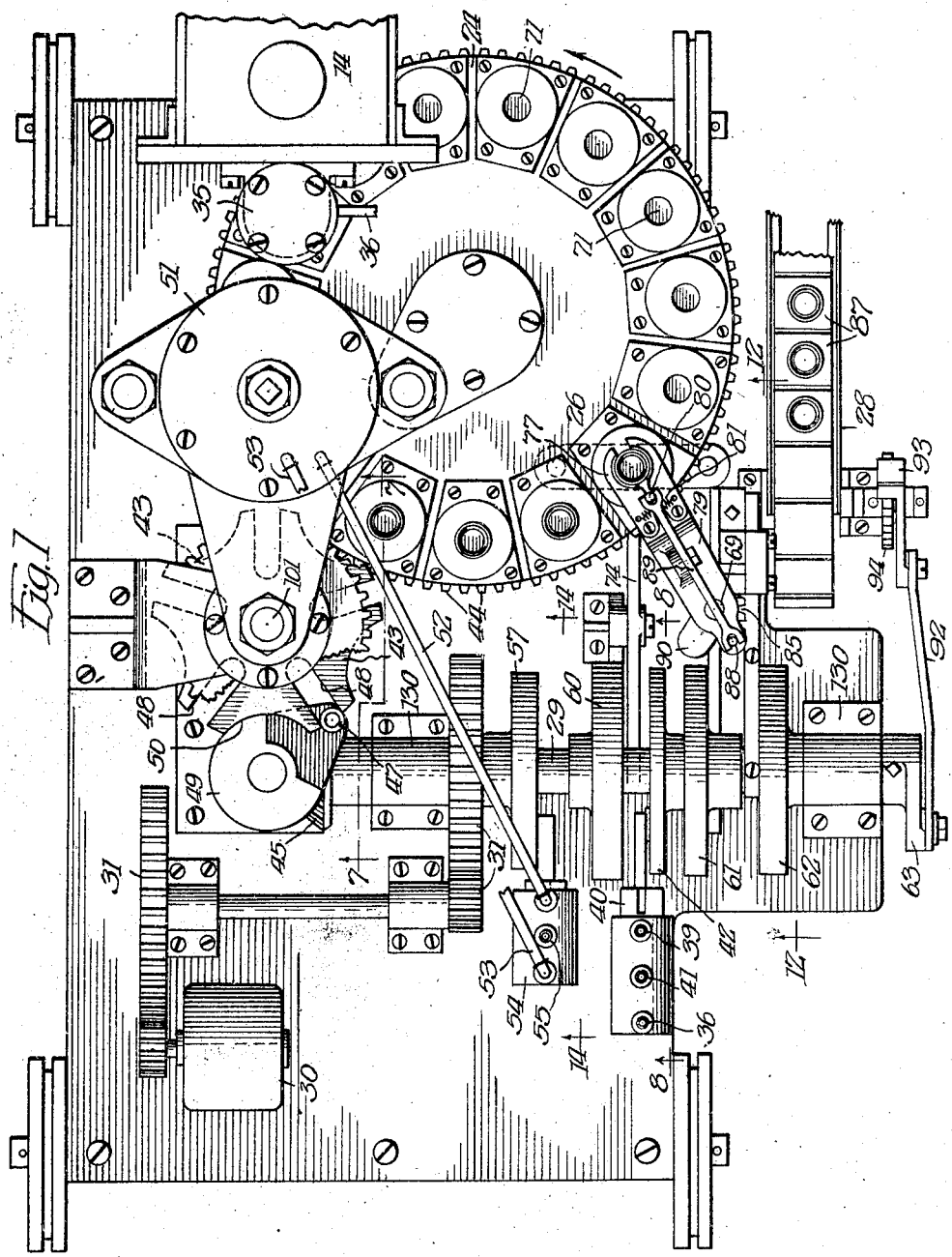

Sept. 4, 1923.

S. E. WINDER

GLASS MOLDING MACHINE

Filed July 25, 1919

1,466,867

7 Sheets-Sheet 1

Witness:
Leonard W. Novander

Inventor:
Samuel E. Winder,
By E. J. Andrews
Atty.

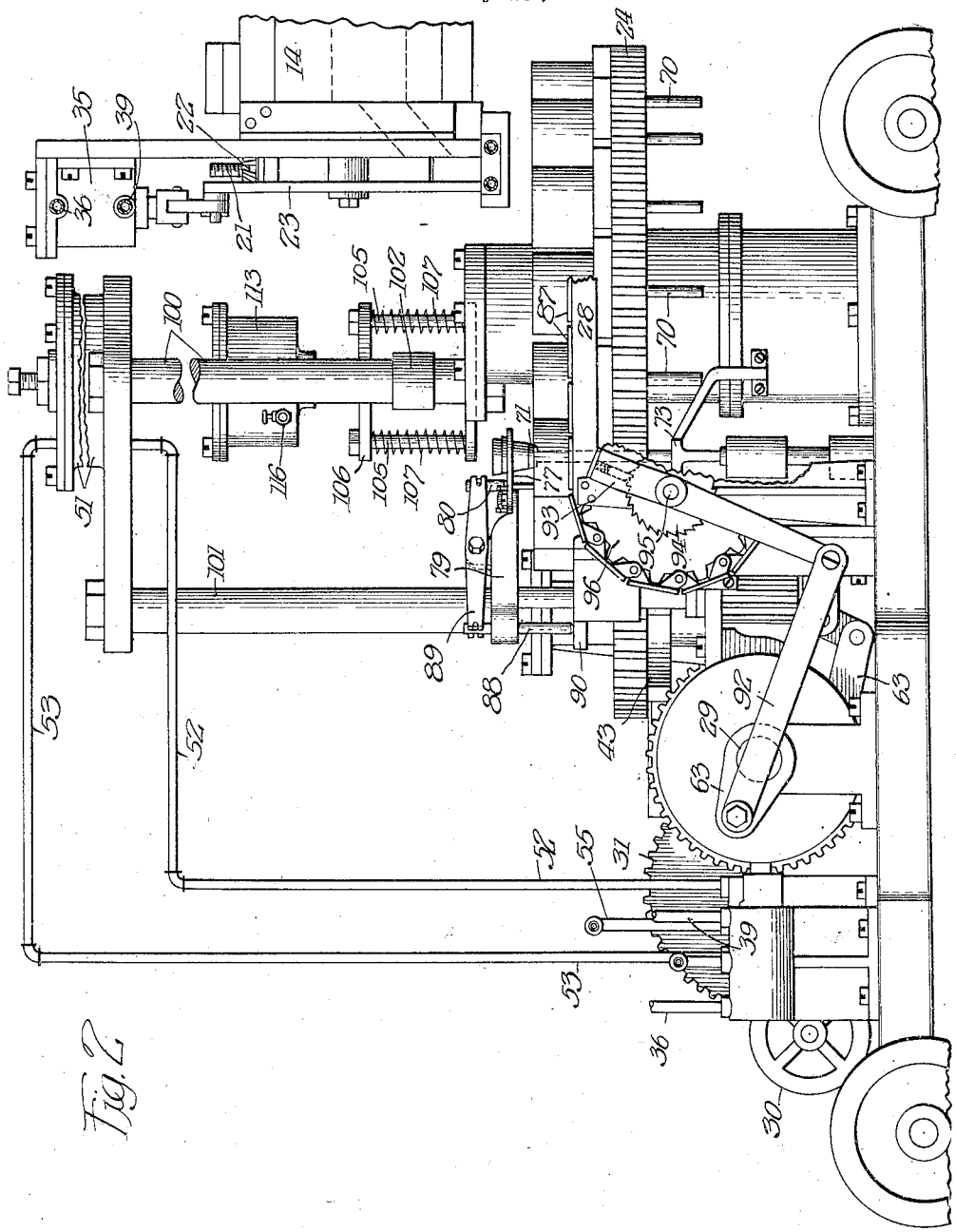

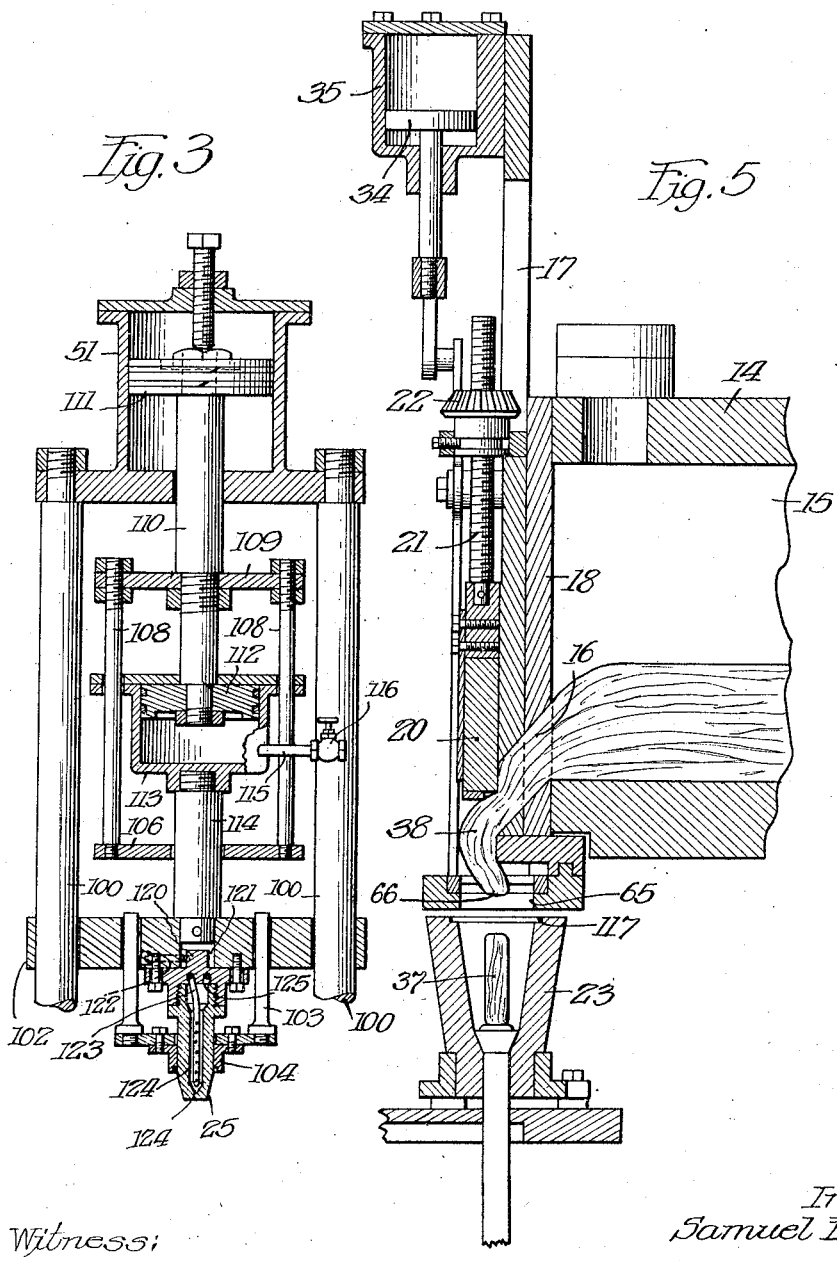

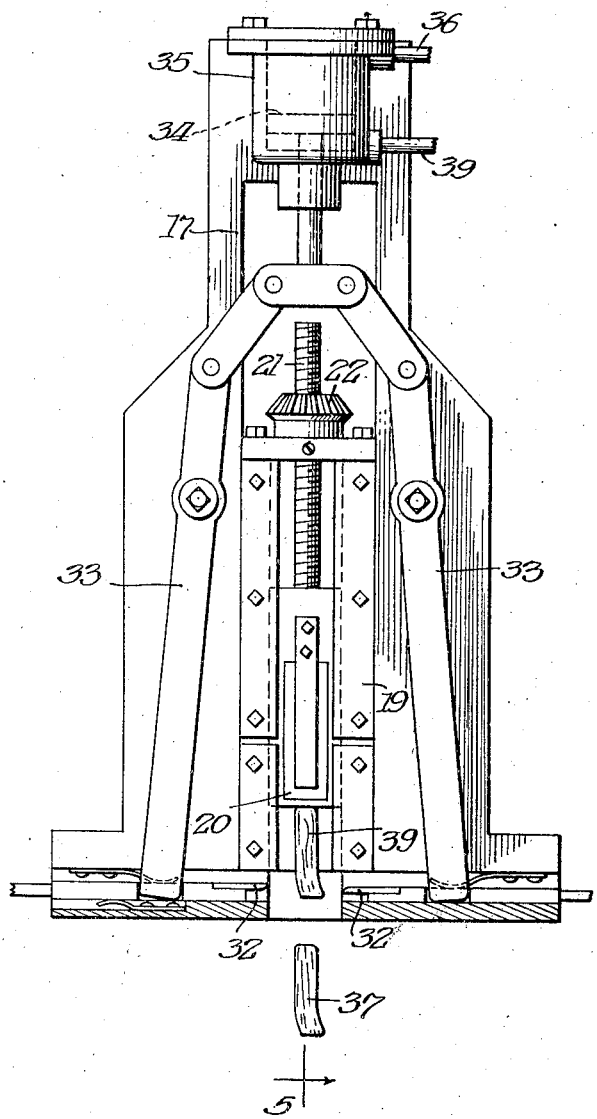

Sept. 4, 1923.
S. E. WINDER
GLASS MOLDING MACHINE
Filed July 25, 1919
1,466,867
7 Sheets-Sheet 5
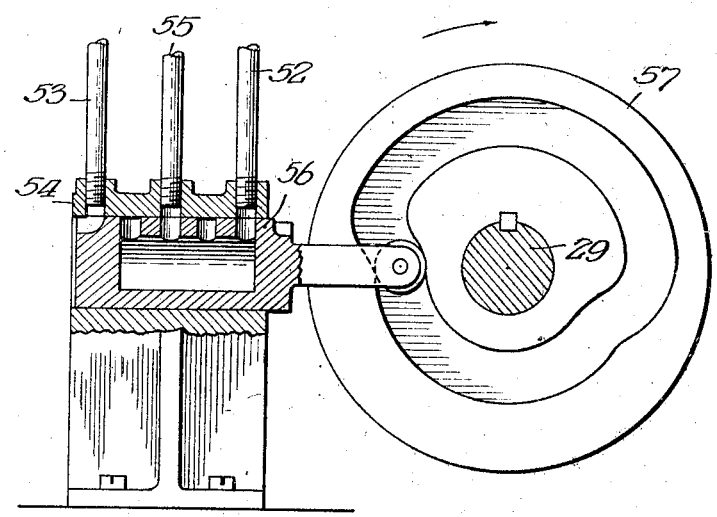
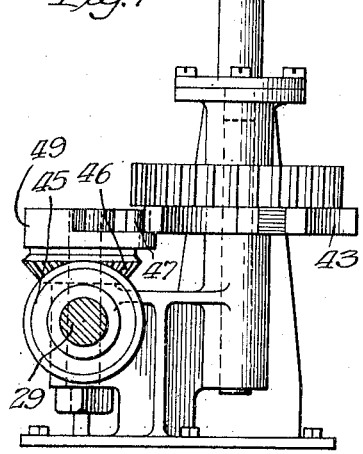
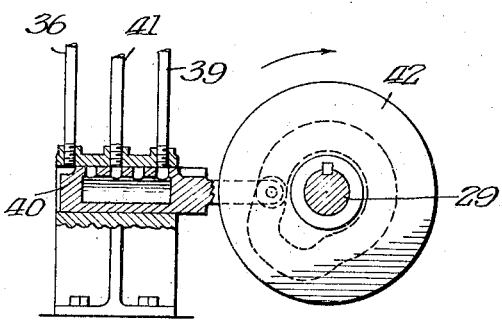

Sept. 4, 1923.
S. E. WINDER
GLASS MOLDING MACHINE
Filed July 25, 1919
1,466,867
7 Sheets-Sheet 6
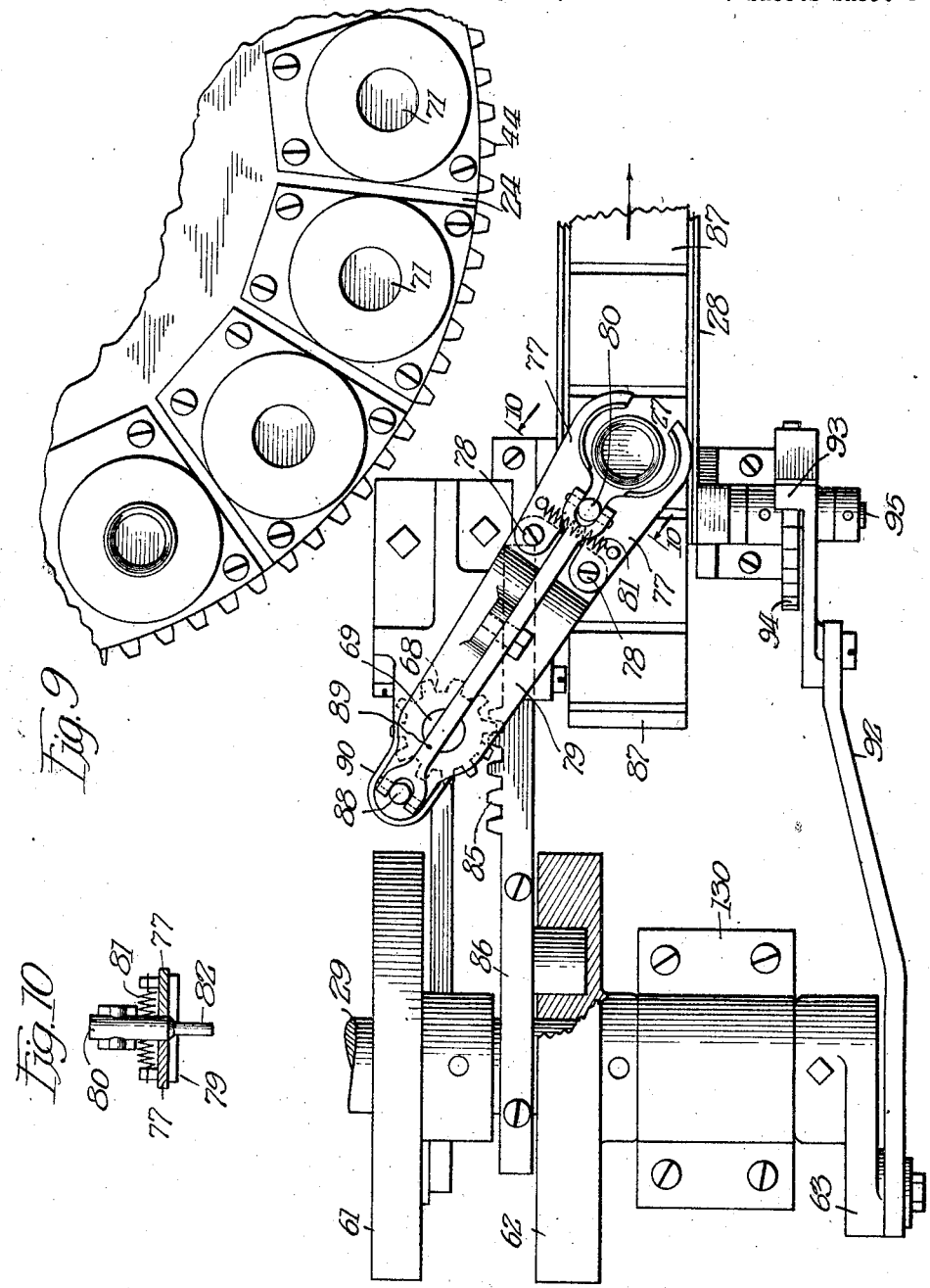
Witness:
Leonard W. Novander
Inventor:
Samuel E. Winder,
By E J Andrews
Atty.

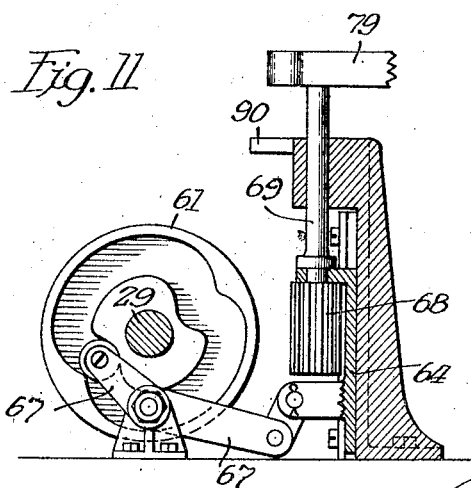
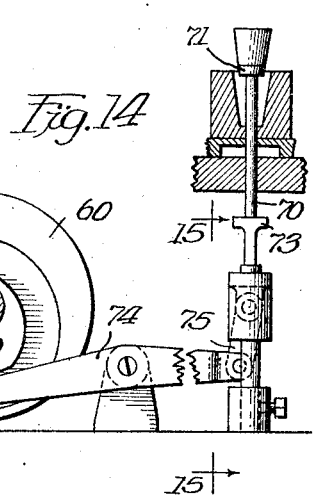
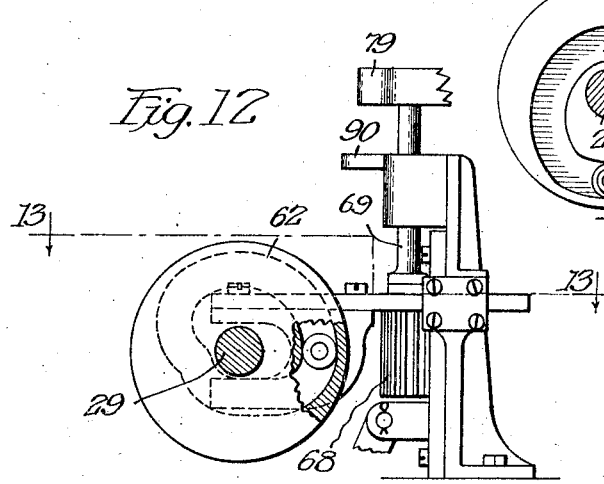
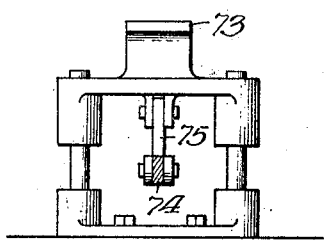
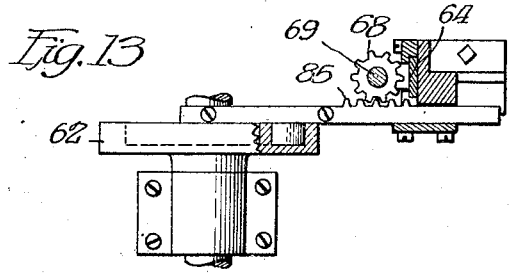

Patented Sept. 4, 1923.

1,466,867

UNITED STATES PATENT OFFICE.

SAMUEL E. WINDER, OF CHICAGO, ILLINOIS.

GLASS-MOLDING MACHINE.

Application filed July 25, 1919. Serial No. 313,210.

*To all whom it may concern:*

Be it known that I, SAMUEL E. WINDER, a citizen of the United States, residing at Chicago, in the county of Cook and State of Illinois, have invented certain new and useful Improvements in Glass-Molding Machines of which the following is a specification.

This invention relates to glass molding machines, and particularly to machines which are adapted to mold glass tumblers and the like.

One of the objects of the machine is to increase the rate at which the tumblers, or other articles, may be molded into shape. A further object is to improve the quality of the molded article. A further object is to produce a machine which is extremely simple and dependable, and one that is accurate, particularly in reference to the registering of the various parts. Further objects of the invention will be apparent from a consideration of the accompanying drawings and the following description thereof.

Of the drawings, Fig. 1 is a plan view of a machine which embodies features of my invention. Fig. 2 is an elevation of the machine. Fig. 3 is an elevation of the plunger mechanism of the machine, at right angles to the view shown in Fig. 2. Fig. 4 is an elevation of the mechanism for delivering the plastic material to the molding machine. Fig. 5 is a section along the line 5—5 of Fig. 4. Fig. 6 is a detail view of the means for operating the plunger of the machine. Fig. 7 is a detail view of the means for rotating the mold table of the machine. Fig. 8 is a detail view of the means for operating the shears. Fig. 9 is an enlarged plan view of the means for removing the tumblers from the machine. Fig. 10 is a detail view of a portion of the means shown in Fig. 9. Figs. 11, 12 and 13 are detail views of the tumbler removing mechanism. Figs. 14 and 15 are detail views of the means for removing the tumblers from the molds.

In general the machine which I prefer to illustrate my invention comprises feeding mechanism for delivering the molten glass in a proper manner to the molds of the molding machine; mechanism for moving the molds to the various positions desired; mechanism for molding the molten mass into tumblers; mechanism for suitably removing the tumblers from the molds; mechanism for removing the tumblers from the machine; mechanism for carrying the tumblers away from the machine; and other incidental mechanism.

The molding machine is used in connection with any suitable form of glass furnace 14 provided with a conduit 15 for conveying the molten glass to the feeding mechanism. The feeding mechanism comprises a framework of any suitable form, such as the frame 17, which is fixed, in any suitable manner, in the ends of the furnace adjacent to the clay plate 18, which partly closes the end of the conduit and through which is formed the outlet 16. Fixed to the frame 17, are guides 19, which allow a gate 20 to be slidably mounted in front of the outlet 16, so that the magnitude of the outlet may be varied by varying the position of the gate. In order to suitably control the position of the gate I provide a screw 21 which is connected by its lower end to the gate. The upper end of the screw is threaded into a beveled gear 22 rotatably mounted in the frame, and this gear may be rotated by any suitable means.

In operation, the molten mass of glass flows downwardly through the inclined outlet 16, which opens outwardly through the vertical end of the conduit, and, at the proper time, the plastic glass is cut off by knives, and the severed mass passes into one of the molds 23. Upon receiving the molten mass the mold table 24 which supports the molds is rotated step by step until the glass is molded, in a manner hereinafter described. The mold containing the molded tumbler is then rotated step by step until the position 26 is reached. The tumbler is then lifted from the mold by the mechanism indicated in Fig. 14, and is then grasped by a clamp 27, and removed from the molding machine and deposited upon the carrier 28. Finally, by suitable mechanism, the carrier 28 is moved step by step, and the tumblers deposited thereon are transported wherever desired.

One of the features of my invention is the use of a single shaft 29 for operating all of the different parts of the machine. The use of this single operating shaft not only very materially simplifies the operating mechanism of the machine, but it insures absolutely synchronous operation of all of the parts. One of the objects of the invention is to reduce to a minimum the time required to mold and deliver the tumblers. In order to accomplish this it is desirable to have every step taken by any portion of the molding and delivering mechanism occur at exactly the right instant, as any delay in any of the steps with reference to a single tumbler results in an enormous delay in the course of time. Also it has been found that with plastic material like molten glass it is necessary to time each step according to the condition of the glass, it being understood that the glass as soon as it begins to pass from the conduit of the furnace, begins to cool and harden, and that each step with reference to this molding must be taken at exactly the right time or the best product will not be produced.

The universal operating shaft 29 may be driven in any suitable manner; I prefer for the purpose a motor 30 operating through gearing 31, and thus rotating at a slow speed the shaft 29. Connected directly to this shaft are the means for operating the feeding mechanism, molding mechanism, the tumbler elevating mechanism, the tumbler removing mechanism, and the tumbler transporting mechanism; and each of these now will be described in its order.

The glass delivering mechanism comprises, in addition to the conduit and the opening therein, shears 32 which are operated by means of levers 33 connected in any suitable manner to a piston 34 in a cylinder 35. At the proper time compressd air from any suitable source may be passed into the upper end of the cylinder through the pipe 36 in order to close the shears by pressing down the piston 34 and to thus cut off a mass 37 of molten material from the flowing stream 38. Also, at the proper time, air may be passed into the lower end of the cylinder 35 through the pipe 39 in order to force the piston 34 upward and to open the shears. In order to properly control the flow of air through the pipes 36 and 39 a valve 40 is used. Compressed air is passed into the valve casing through the pipe 41, which is connected to any suitable source of supply, and the air is passed to and from the cylinder 35 through the pipes 36 and 39, in an ordinary manner. The valve 41 is operated by means of the cam wheel 42 directly connected to the shaft 29.

The mold table 24 is operated by means of a slotted wheel 43 having teeth on its periphery which mesh with the teeth 44, on the periphery of the table 24. The wheel 43 is operated by means of beveled gears 45 and 46. Upon the wheel 46 is fixed a pin 47 which is arranged, at suitable times, to pass into the slots 48 of the wheel 43, and thus to give to the wheel 43 a step by step rotation, which is imparted to the mold table 24. In this manner, for each rotation of the shaft 29, a rotary step movement is given to the table 24 sufficient to move each mold from its position to the adjacent mold position, in the direction of the arrow. In order to lock the wheel 43 in position, so as to prevent any movement thereof when it is desired to have the mold table stationary, a segment 49 of the upper portion of the wheel 46 projects upwardly and passes into the circular depression 50 in the wheel 43, remaining therein from the time the pin 47 passes out of one slot 48 until it passes into the adjacent slot, thus holding the wheel 43 firmly at rest.

The plunger 25 is operated by means of a piston cylinder 51, which is supplied with compressed air by means of the pipes 52 and 53 connected to the casing 54, which is supplied with compressed air from any suitable source by means of the pipe 55. The control of the air through these various pipes is produced by means of a valve 56, in an ordinary manner; the valve 56 being operated by means of the cam wheel 57 which is fixed to the shaft 29.

The tumbler elevating device is adapted to elevate the tumbler from the mold as soon as the glass has become sufficiently hard, in order to assist in removing the tumbler from the machine, and also in order to assist in cooling the mold and the tumbler itself. This mechanism, described more fully hereinafter, is indicated in Fig. 14, and is operated by the cam wheel 60, which is mounted directly upon the shaft 29. The tumbler removing device, illustrated by Figs. 11, 12 and 13, is operated by the cam wheels 61 and 62 mounted directly upon the shaft 29. And the tumbler transferring device, a plan view of which is shown in Fig. 9, is operated by the crank 63 fixed to the shaft 29. It will thus be seen that the entire operation of the machine is controlled by the shaft 29, each of the various mechanisms being directly connected thereto, and all of the mechanisms being in parallel with each other, and depending directly upon the rotation of the shaft 29.

In operation the plastic material flows through the opening 16 in the end of the conduit 15 and passes downwardly in a continuously moving stream through the opening 65 of the cutting mechanism, and the operation of the mold table is such that just before the lower end 66 of the downwardly flowing stream of molten glass has reached the plane of the upper end of the mold, the mold passes under the stream and comes to rest immediately beneath the stream. The shears are then operated by means of the valve 40 and the cylinder 35, and the mechanism connecting the piston 34 with the shears, and the mass of glass 37 is severed from the stream and passes into the mold. The mold table is then rotated by means of the wheel 43, a single step, so that a new mold is brought into position under the flowing stream. At the same time a mold is brought under the plunger 25, and, as soon as the mold table is brought to rest, the plunger is forced downwardly by means of the valve 56, and the cylinder 51.

At the same time a tumbler is elevated from the mold in the position 26, by the following means: Slidably mounted, through apertures in the bottom of each mold, is a valve stem 70 to which is fixed a valve 71 which forms the bottom of the mold. As the table rotates each valve stem, when the mold reaches the position 26, passes over the plate 73, which is mounted for vertical movement; and the cam 60 by forcing downwardly the cam end of the lever 74 forces upwardly the plate 73 by means of the connecting link 75, as indicated in Fig. 14, thus elevating the valve and the tumbler. When the tumbler is thus elevated the tumbler removing clamp 27 grasps the tumbler and transfers it from the valve 71 to a position over the traveling belt 28. The tumbler is then lowered on to one of the plates 87 of the belt and is released from the clamp.

The operation of the tumbler removing clamp is as follows: Normally the clamp is elevated with its jaws immediately over the mold in position 26. The jaws 77 of the clamp are pivoted at the points 78 to an arm 79 and are held open by means of the pin 80 which has been forced between the jaws against a spring 81 tending to hold the jaws closed. At the proper time the cam 61, by elevating the cam end of the lever 67 lowers a frame 64, in which is rotatably mounted an elongated gear wheel 68 on a shaft 69. In this manner the shaft 69 is also lowered; and, mounted on the upper end of the shaft, is the arm 79, so that the arm together with the clamp jaws are lowered, and the jaws encircle the elevated tumbler. As the jaws lower, the lower end 82 of the pin 80 strikes upon the edge of the mold, and the pin is held at rest while the jaws of the clamp pass downwardly relative to the pin until the jaws pass to the small end 82 of the pin and are pulled together by the spring 81 and thus clasp the tumbler. When the tumbler has been clasped by the jaws the teeth 85 fixed to cam arm 86, which is operated by the cam wheel 62, meshing with the teeth of the gear wheel 68, cause the shaft 69 to rotate. The shaft 69 thus moves the jaws 77 of the clamp to the position indicated in Fig. 9, directly over one of the receiving plates 87 of the belt 28. The cam wheel 61 then elevates the cam end of the lever 67 and thus lowers the shaft 69 and the clamp, allowing the tumbler to rest upon the plate 87, and at the same time a pin 88 pivoted to the outer end of the lever 89 strikes upon the plate 90, and is forced upwardly carrying with it the end of the lever 89 and forcing downwardly the pin 81 which is pivoted to the other end of the lever. In this manner the pin 81 is again forced downwardly between the jaws 77 and the jaws are forced open and the tumbler is thus released. The cam 61 then elevates again the arm 79, and the teeth 85 again rotate the shaft 69, but in the opposite direction, so as to move the jaws 77 to its position over the mold at the position 26.

The belt 28 is given a step by step movement by means of the crank 63 and the link 92 giving a rocking movement to a pawl frame 93, in which is mounted a pawl coacting with the ratchet wheel 94 fixed to the shaft 95 upon which is mounted a sprocket wheel 96 around which the belt 28 is mounted. The tumblers by means of this carrier may be removed to any point desired.

The mechanism for molding the glass, in addition to the molds and the plunger 25 comprise means for suitably pressing the plunger in the mass in the mold, so as to properly form the tumbler. In order to properly support the mechanism and form suitable guides therefor, I provide posts 100 firmly mounted in the framework of the machine, together with an additional post 101 for increasing the rigidity of the mechanism. Slidably mounted on the posts 100 is a cross bar 102 which forms a guide for pins 103 supporting a ring 104 which is adapted to press upon the upper end of the mold as the tumbler is being formed and properly form the upper edge of the tumbler. This ring is supported by bolts 105 slidably mounted in the ring 106, and springs 107 tends to hold the ring 104 away from the ring 106. The ring 106 is fixed, by means of the bolts 108 to a cross head 109 which is fixed to the rod 110 of the piston 111. The lower end of the rod 110 is fixed to a piston 112 in the cylinder 113; and the lower end of the cylinder 113 is fixed, by means of a rod 114 to the cross head 102. A consideration of this mechanism will show that, when compressed air is passed into the upper end of the cylinder 51, the pistons 111 and 112 will be pressed downwardly, and, as the lower end of the cylinder 113 is full of compressed air the cylinder, together with the cross bar 102, will move downwardly; and, as the plunger 25 is fixed to the cross bar 102, the plunger also will be forced downwardly into the mold. At the same time the ring 104 will be forced downwardly, by means of the ring 106 and the springs 107.

In practice it has been found impossible to supply, at all times, uniform masses of the molten material; and it becomes necessary to provide suitable pressure under varying quantities of material in the mold. Evidently if the plunger were rigidly fixed to the piston 111 the downward movement of the plunger would be determined by the movement of the piston; and in case of a greater quantity of glass in the mold at one time than another there would be a greater pressure on the glass; and as the pressure on the glass should be uniform in order to produce the best results, some tumblers would necessarily be inferior. To obviate this I provide the intermediate cylinder 113 which is adapted to provide means for varying slightly the position of the plunger at the end of the downward stroke without varying the maximum pressure thereon, thus compensating for varying masses of molten material, and at the same time maintaining the maximum pressure for an appreciable length of time, so as to allow the plastic material to properly set in form. To produce this result I maintain in the cylinder 113 a substantially constant air pressure by any suitable means, such as a storage tank, having a desired constant pressure, connected to the cylinder by means of the pipe 115 in which I provide some adjustable restricting means, such as the valve 116; so that, when the piston 112 is forced downwardly into the cylinder 113, the air contained in the cylinder will be at liberty to pass back to the source through the restricting means 116, but the rate of passage thereof will depend upon the rate of degree of the restriction in the pipe. As a consequence when the plunger is forced downwardly into the mold, the pressure will cause relative movement of the piston 112 and the piston 111; but because of the restriction, the pressure in the cylinder 113 will rise to a certain maximum amount, beyond which it will not go. By suitably adjusting the restriction and the pressure of the compressed air in the storage tank, the maximum pressure on the mold may be suitably predetermined at any desired amount.

The ring 104, before the plunger reaches its lowest position, is positioned on the ring seat 117 of the mold. (Fig. 5), and is pressed firmly thereon by means of the springs 107; so that the glass is prevented from passing out of the mold, and the upper edge of the glass is pressed in suitable shape. As a consequence of this, it will be seen that any surplus amount of glass is retained in the mold, and the necessity arises for some constant pressure means, such as hereinabove described, acting on the plunger; it being understood that the instant the pressure on the glass reaches a certain predetermined amount, depending upon the material and the article to be molded, the pressure must be neither decreased nor increased any appreciable length of time, as too great a pressure, or a reduction in pressure, before the material has properly set, will produce an inferior article.

In order to adjust the plunger 25 so that it will always be exactly concentric with the molds, I provide in the cross bar 102 to receive the shank 120 of the plunger, an opening 121 somewhat larger than the shank; and provide in the cross bar set screws 122 which are adapted to press against the shank 120, and thus adjustably hold the shank, and hence the plunger, rigidly in place with reference to the cross bar and concentric with the mold. Means for cooling the plunger are also provided comprising a water intake pipe 123, a conduit 124, passing longitudinally downwardly and upwardly in the plunger 25, and a water outlet pipe 125, by means of which water or other liquids may be forced through the plunger if desired.

By these various means it will be seen that I have provided a glass molding machine which is so arranged that all of the different parts necessarily coact in exact synchronism, as there is substantially no lost motion of the parts themselves; and no time is lost in the movements of the various mechanisms. As a consequence the rate of production of the tumblers can be carried out at a maximum. And, further, the mechanism itself is materially simplified so that liability of the machine working improperly is materially reduced; and if it becomes necessary to repair or adjust any of the parts they may be easily removed from the machine, it being necessary in order to remove substantially the entire operative mechanism only to remove the upper bearings 130 of the shaft 29. The entire shaft, then with little difficulty, may be elevated and even removed, and any of the parts thereof adjusted or repaired or replaced.

I claim as my invention:

1. In a glass molding machine a plunger, means for intermittently forcing said plunger downwardly into the substance to be molded, and means for producing equal predetermined maximum pressures for every operation of the plunger and for maintaining each of these maximum pressures substantially constant for an appreciable length of time.

2. In a pressing machine, a plunger and means for maintaining constant the maximum pressure on said plunger; said means comprising a cylinder, a piston in said cylinder, means for supplying compressed gas in said cylinder, and means for restricting the capacity of the supplying means.

3. In a glass molding machine a plunger, means for operating said plunger, and means for limiting the maximum pressure on said plunger to a predetermined amount and for maintaining said maximum pressure substantially constant for an appreciable length of time, said latter means operatively connecting said plunger and said former means; said limiting means comprising a cylinder and a piston in said cylinder, said cylinder being connected to said plunger and said piston being connected to said operating means.

4. The combination of a member to be intermittently pressed and moved variable distances, means for producing pressure on said member, and constant maximum pressure maintaining mechanism connecting said member and said means; said mechanism comprising a fluid tight chamber, two opposite walls of said chamber being relatively movable, one of said walls being connected to said member and the other of said walls being connected to said pressure producing means, and means for passing a fluid into and out of said chamber.

5. A glass molding machine comprising a plunger for molding glass articles, operating means for said plunger, said means comprising a plunger rod, two independent cylinders, one fixed and the other movable, said rod being fixed to said movable cylinder, a piston in each of said cylinders, and a rod connecting said pistons.

6. A glass molding machine comprising a plunger and operating means therefor, said means comprising two cylinders, a piston in each of said cylinders, a rod connecting said pistons, one of said cylinders being slidable, said plunger being connected to said slidable piston, and means for passing compressed air alternately in the ends of said fixed cylinder.

7. A glass molding machine comprising a plunger, and operating means therefor, said means comprising two cylinders, a piston in each of said cylinders, a rod connecting said pistons, one of said cylinders being fixed and the other being slidably mounted, and means for passing compressed air alternately in the ends of one of said cylinders, the other cylinder containing compressed air.

8. In a glass molding machine a plunger and operating means therefor, said means comprising two cylinders, a piston in each of said cylinders and a rod connecting said pistons, and means for passing compressed air alternately in the ends of one of said cylinders, a source of compressed air, and a pipe connecting the other cylinder with said source.

9. In a glass molding machine a plunger and operating means therefor, said means comprising two cylinders, a piston in each of said cylinders and a rod connecting said pistons, and means for passing compressed air alternately in the ends of one of said cylinders, a source of compressed air, and a pipe connecting the other cylinder with said source, and adjustable restricting means in said pipe.

10. In a glass molding machine, a frame, a plunger rod mounted for vertical movement in said frame, a plunger fixed to said rod, and means for adjusting the horizontal position of said plunger with reference to said rod.

In testimony whereof, I hereunto set my hand.

SAMUEL E. WINDER.